(12) United States Patent
Takemoto et al.

(10) Patent No.: US 11,318,999 B2
(45) Date of Patent: May 3, 2022

(54) BODY SIDE PANEL

(71) Applicant: NISSAN MOTOR CO., LTD., Yokohama (JP)

(72) Inventors: Shinichiro Takemoto, Kanagawa (JP); Toshikazu Torigaki, Kanagawa (JP); Tetsuro Naito, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/056,853

(22) PCT Filed: May 24, 2018

(86) PCT No.: PCT/JP2018/019993
§ 371 (c)(1),
(2) Date: Nov. 19, 2020

(87) PCT Pub. No.: WO2019/224973
PCT Pub. Date: Nov. 28, 2019

(65) Prior Publication Data
US 2021/0229748 A1  Jul. 29, 2021

(51) Int. Cl.
*B62D 29/00* (2006.01)
*B62D 25/02* (2006.01)
*B62D 25/04* (2006.01)
*B62D 25/20* (2006.01)

(52) U.S. Cl.
CPC .......... *B62D 29/004* (2013.01); *B62D 25/02* (2013.01); *B62D 25/025* (2013.01); *B62D 25/04* (2013.01); *B62D 25/2036* (2013.01)

(58) Field of Classification Search
CPC ...... B62D 25/02; B62D 25/04; B62D 25/025; B62D 25/2036; B62D 29/001; B62D 29/004
USPC ...... 296/181.2, 193.06, 209, 203.01, 203.03, 296/187.09, 187.1, 187.11, 187.12
See application file for complete search history.

(56) References Cited

U.S. PATENT DOCUMENTS

| | | |
|---|---|---|
| 8,080,296 B2 | 12/2011 | Malek et al. |
| 2004/0037625 A1 | 2/2004 | Corrias et al. |
| 2006/0233598 A1 | 10/2006 | Corrias et al. |
| 2010/0173125 A1 | 7/2010 | Malek et al. |
| 2013/0181487 A1 | 7/2013 | Krueger et al. |
| 2015/0291228 A1 | 10/2015 | Huber et al. |

FOREIGN PATENT DOCUMENTS

| | | | |
|---|---|---|---|
| CN | 206736753 U | * 12/2017 | |
| DE | 102015107826 B3 | * 4/2016 | ............... A01G 9/02 |
| JP | 10-310083 A | 11/1998 | |
| JP | 2004-502599 A | 1/2004 | |
| JP | 2010-149511 A | 7/2010 | |
| JP | 2011092242 A | * 5/2011 | |

(Continued)

*Primary Examiner* — Dennis H Pedder
(74) *Attorney, Agent, or Firm* — Foley & Lardner LLP

(57) ABSTRACT

A body side panel includes a metal panel and plastics that are integrally-molded on the metal panel to reinforce the metal panel. The plastics include a plastic layer formed on a surface of the metal panel and ribs raised from the plastic layer. The ribs have plural straight ribs formed radially from an end edge portion of the metal panel on its outer circumferential side along the surface thereof, and a joint rib jointing the plural straight ribs so as to intersect therewith.

20 Claims, 9 Drawing Sheets

(56) References Cited

FOREIGN PATENT DOCUMENTS

| | | | | |
|---|---|---|---|---|
| JP | 2013-542121 | A | 11/2013 | |
| JP | 6190848 | B2 * | 8/2017 | |
| WO | WO-2017130167 | A1 * | 8/2017 | ............. B60B 33/00 |

* cited by examiner

BODY SIDE PANEL

TECHNICAL FIELD

The present invention relates to a body side panel in which a metal panel is reinforced by plastics.

BACKGROUND ART

For example, a hybrid-designed light-weight material in which thermoplastic resin contained with carbon fibers as a reinforcing material is integrally molded on a metal plate is known (Patent Literature 1). The light-weight material of the Patent Literature 1 has a rib structure in a pillar or in a sill structure at a lower portion of a body side of an automobile, for example.

CITATION LIST

Prior-Art Literature

Patent Literature 1: Japanese Patent Application Publication No. 2010-149511

SUMMARY OF INVENTION

Problem to be Solved by the Invention

In the light-weight material of the Patent Literature 1, grid-like ribs made of plastics are formed on almost an entire surface of a lower portions of a body side panel and a pillar in order to improve its rigidity against an impact load. Therefore, a used amount of the plastics becomes large, and thereby its light-weighting is limited.

Then, an object of the present invention is to achieve light-weighting of a body side panel in which plastics are integrally molded on a metal panel while ensuring its rigidity.

Means for Solving the Problem

In a body side panel according to an aspect of the present invention, plastics that are integrally-molded on a metal panel have plural straight ribs formed radially from an end edge portion of the metal panel on an outer circumferential side thereof and a joint rib jointing the plural straight ribs.

Effects by Invention

According to the present invention, it is possible to achieve light-weighting of a body side panel in which plastics are integrally molded on a metal panel while ensuring its rigidity.

DESCRIPTION OF EMBODIMENTS

Hereinafter, embodiments of the present invention will be explained based on the drawings.

First Embodiment

Figure 1:
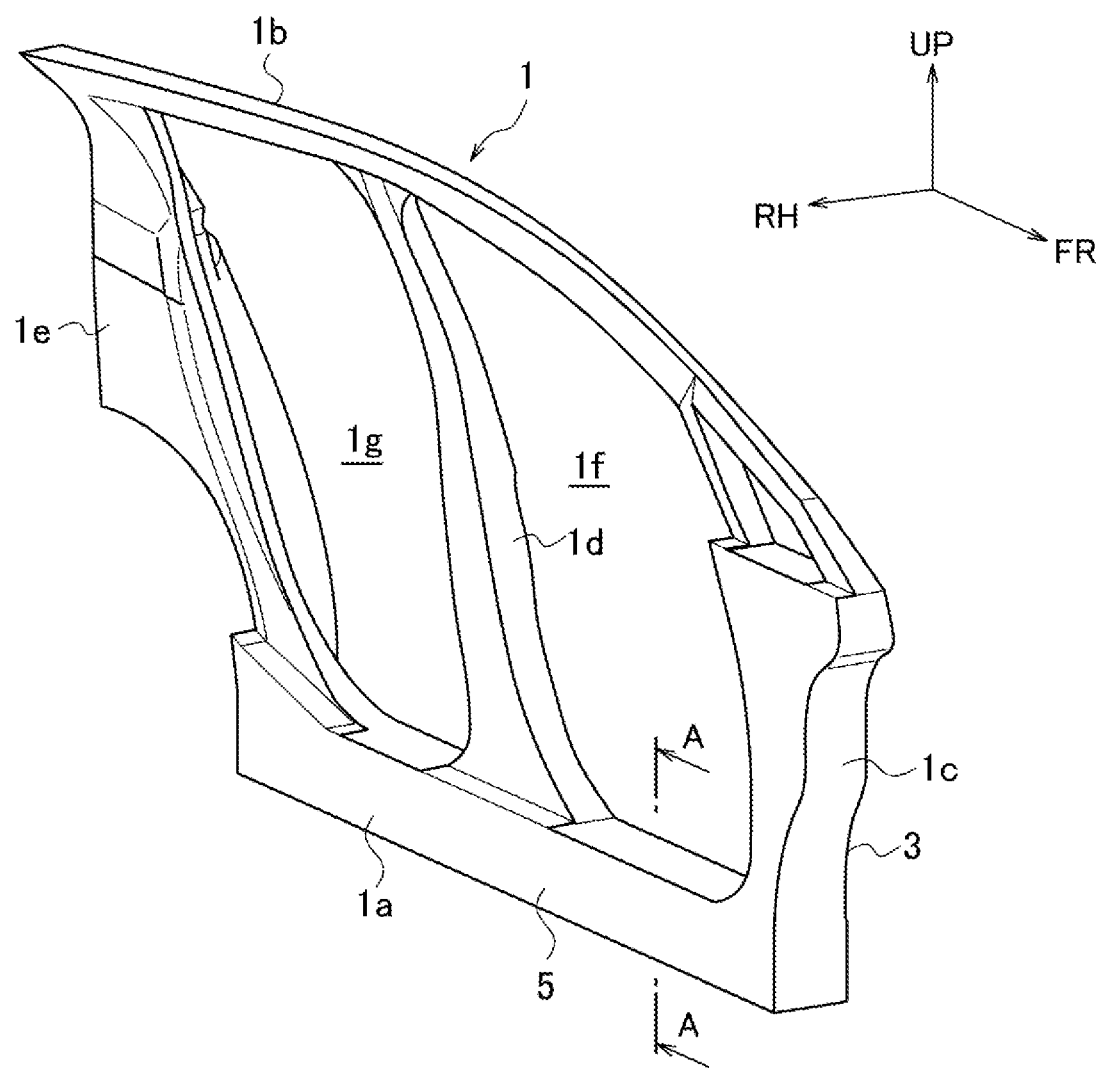
FIG. 1 is a perspective view of a body side panel of an automobile according to a first embodiment.

A body side panel 1 of an automobile according to a first embodiment will be explained with reference to FIG. 1 to FIG. 3. Note that the body side panel 1 shown in FIG. 1 is a left-side body side panel, and explanations for a right-side body side panel are omitted because it has a shape bilaterally symmetric to the left-side body side panel. A direction indicated by an arrow FR in the drawings is a forward direction with respect to the vehicle, a direction indicated by an arrow UP is an upward direction with respect to the vehicle, and a direction indicated by an arrow RH is a rightward direction with respect to the vehicle.

The body side panel 1 shown in FIG. 1 includes a sill portion 1a that positions at its lower portion and extends in a front-back direction of the vehicle, a roof portion 1b that positions at its upper portion and extends in the front-back direction of the vehicle, and pillar portions 1c, 1d and 1e, front, center and rear, respectively, each of which connects the sill portion 1a and the roof portion 1b with each other. Each of the pillar portions 1c, 1d and 1e extends in an up-down direction. The front pillar portion 1c positions at a front portion of the vehicle, the rear pillar portion 1e positions at a rear portion of the vehicle, and the center pillar portion 1d positions between the front pillar portion 1c and the rear pillar portion 1e. A front door opening portion 1f is formed between the front pillar portion 1c and the center pillar portion 1d, and a rear door opening portion 1g is formed between the center pillar portion 1d and the rear pillar portion 1e.

Figure 2:
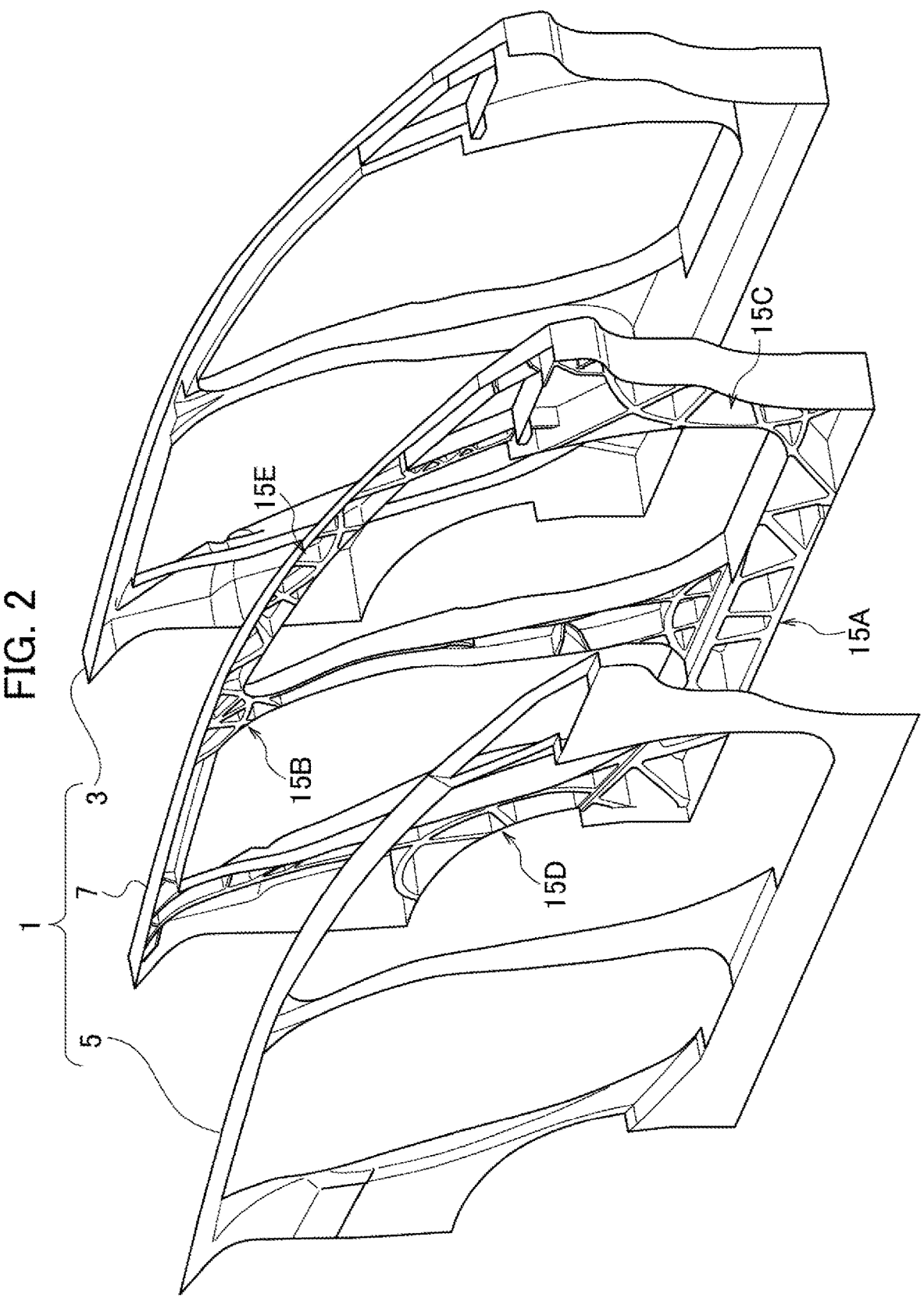
FIG. 2 is an exploded perspective view of the body side panel shown in FIG. 1.
Figure 4:
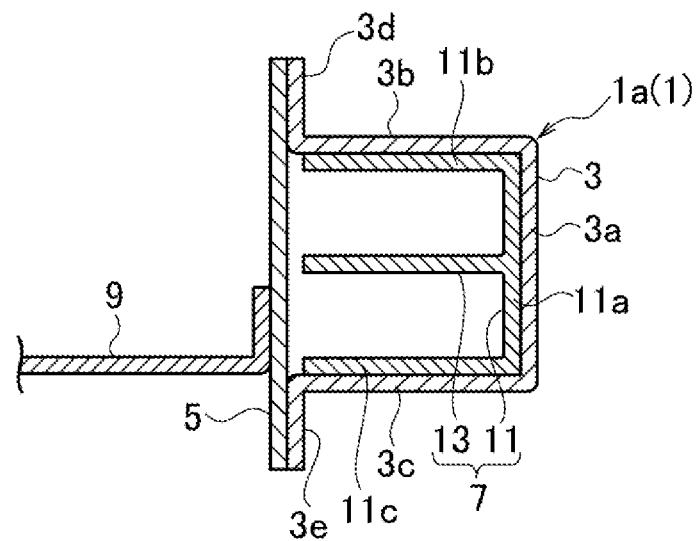
FIG. 4 is a cross-sectional view taken from an A-A line in a state where a floor panel is added to a sill portion shown in FIG. 1.

As shown in FIG. 2 and FIG. 4 that is a cross-sectional view taken along an A-A line in FIG. 1, the body side panel 1 includes an outer panel 3 that positions on an outer side in a vehicle width direction, an inner panel 5 that positions on an inner side (a side of a passenger compartment) in the vehicle width side, and a plastic portion 7 that positions between the outer panel 3 and the inner panel 5. The outer panel 3 and the inner panel 5 are metal panels composed of aluminum plates or steel plates, for example, and their thickness is almost 0.3 mm to 3 mm. Note that FIG. 4 shows a floor panel 9 that is not shown in FIG. 1.

As shown in FIG. 4, the outer panel 3 includes a side wall 3a that positions on an opposite side to the inner panel 5, an inner wall 3b that extends from one end portion (an upper end in FIG. 4) of the side wall 3a toward the inner panel 5, and an outer wall 3c that extends from the other end portion (a lower end in FIG. 4) of the side wall 3a toward the inner panel 5. An inner flange 3d protrudes from an end portion of the inner wall 3b on a side of the inner panel 5 toward the front door opening portion 1f (upward in FIG. 4), and an outer flange 3e protrudes from an end portion of the outer wall 3c on the side of the inner panel 5 toward an outside of the front door opening portion if (downward in FIG. 4). The inner panel 5 has almost a flat panel shape as a whole.

The outer panel 3 and the inner panel 5 are integrated with each other by adjoining the inner and outer flanges 3d and 3e of the outer panel 3 to the inner panel 5 by welding. In the sill portion 1a as shown in FIG. 4, the floor panel 9 is adjoined to the inner panel 5 by welding to be fixed therewith on an opposite side to the outer panel 3. Note that, with respect to each of the roof portion 1b and the front, center and rear pillar portions 1c, 1d and 1e, the outer panel 3 basically includes a side wall, an inner wall, an outer wall, and an inner flange and an outer flange similarly to the cross-sectional shape of the sill portion 1a.

Note that the "inner wall" referred to here is a wall portion of the outer panel 3 on a side of the front door opening portion 1f or the rear door opening portion 1g in the sill portion 1a, the roof portion 1b and the front and rear pillar portions 1c and 1e, and the "outer wall" is a wall portion of the outer panel 3 on its outer circumferential side. But, in the center pillar portion 1d, its "inner wall" is a wall portion of the outer panel 3 on a side of the front door opening portion 1f, and its "outer wall" is a wall portion of the outer panel 3 on a side of the rear door opening portion 1g. The inner flanges and the outer flanges are omitted in FIG. 1 to FIG. 3.

Figure 3:
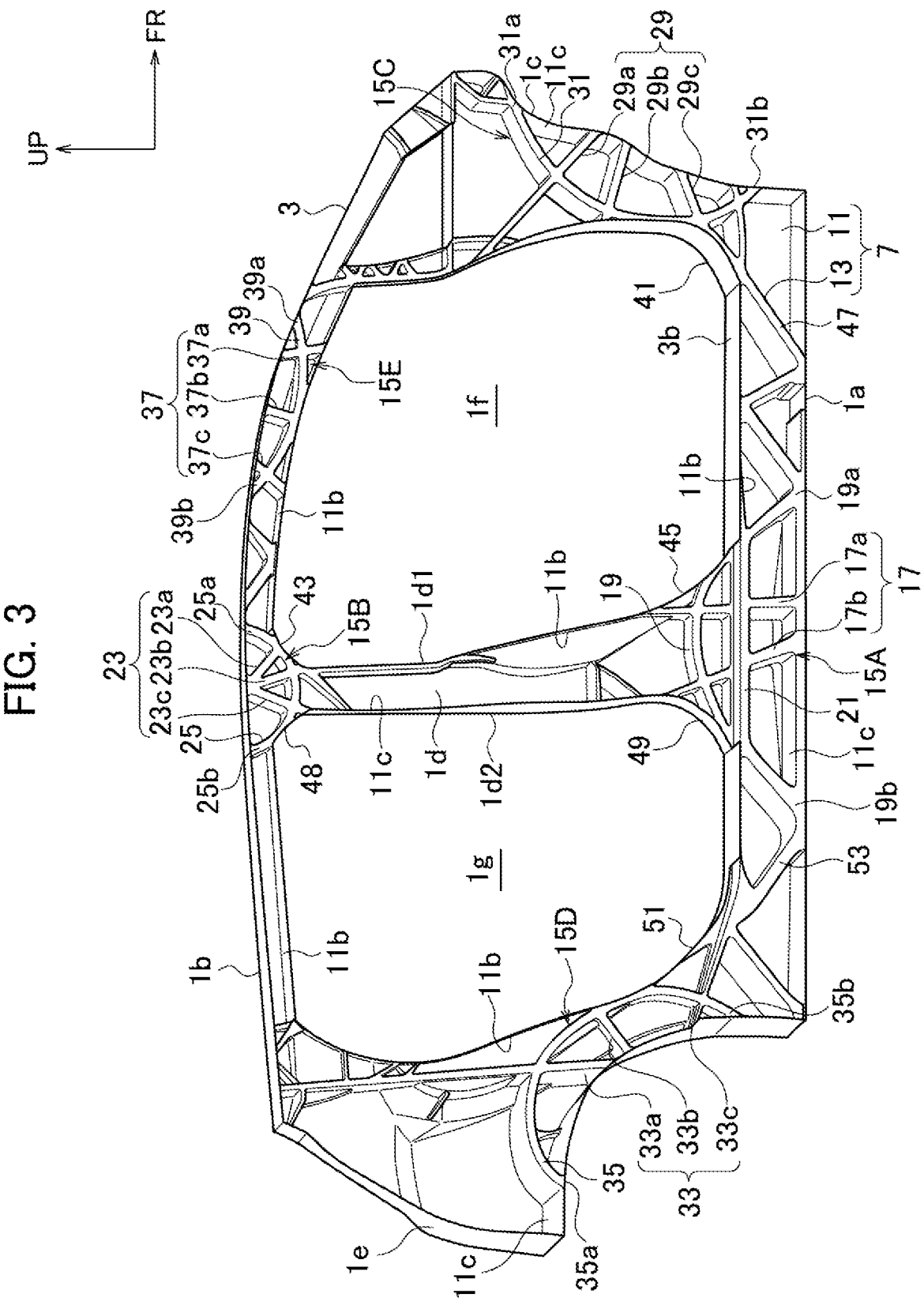
FIG. 3 is a side view, viewed from a side of a passenger compartment, showing a state where a plastic portion is integrally-molded on an outer panel shown in FIG. 2.

As shown in FIG. 3 and FIG. 4, the plastic portion 7 is integrally-molded on a portion of the outer panel 3 that faces to the inner panel 5. For example, the plastic portion 7 is a composite material made by mixing reinforcing fibers such as carbon fibers in thermoplastic resin such as polyamide, and is integrally-molded on the outer panel 3 by injection molding or injection press molding. The plastic portion 7 includes plastic layers 11 and ribs 13. Reinforcing fibers don't have to be mixed in the plastic portion 7.

The plastic layer 11 is formed on almost an entire of surfaces, on a side of the inner panel 5, of the side wall 3a, the inner wall 3b and the outer wall 3c of the outer panel 3. In other words, the plastic layer 11 includes a side wall plastic layer 11a associating with the side wall 3a, an inner wall plastic layer 11b associating with the inner wall 3b and an outer wall plastic layer 11c associating with the outer wall 3c. Also with respect to each of the roof portion 1b and the front, center and rear pillar portions 1c, 1d and 1e basically includes a side wall plastic layer associating with its side wall, an inner wall plastic layer associating with its inner wall and an outer wall plastic layer associating with its outer wall similarly to the cross-sectional shape of the sill portion 1a.

The rib(s) 13 is formed on an opposite surface of the plastic layer 11 to the outer panel 3. The rib 13 provided on the plastic layer 11 is briefly shown in FIG. 4. The thickness of the plastic layer 11 is almost 0.3 mm to 3 mm similarly to those of the outer panel 3 and the inner panel 5.

As shown in FIG. 3, the ribs 13 include at least rib structures 15A, 15B, 15C, 15D and 15E. The rib structure 15A positions at an intersecting portion of the center pillar portion 1d and the sill portion 1a, i.e. at a lower portion of the center pillar portion 1d. The rib structure 15B positions at an intersecting portion of the center pillar portion 1d and the roof portion 1b, i.e. at an upper portion of the center pillar portion 1d. The rib structure 15C positions in the front pillar portion 1c at a vicinity of the sill portion 1a. The rib structure 15D positions in the rear pillar portion 1e at a vicinity of the sill portion 1a. The rib structure 15E positions in the roof portion 1b at a vicinity of the front pillar portion 1c.

The rib structure 15A is composed of radiated ribs 17 and a joint rib 19. The radiated ribs 17 include plural (two, here) straight ribs 17a and 17b, and are radiated toward the center pillar portion 1d while originating from a lower end edge of the sill portion 1a beneath the center pillar portion 1d. The straight rib 17a extends toward a front edge 1d1 of the center pillar portion 1d so as to be almost in the same straight line with the front edge 1d1. The straight rib 17b extends towards a rear edge 1d2 of the center pillar portion 1d so as to be almost in the same straight line with the rear edge 1d2. The lower end edge of the sill portion 1a as the origination corresponds to an end edge portion of the outer panel 3 on its outer circumferential side.

The rib 17a on a front side among the plural straight ribs 17a and 17b connects the outer wall plastic layer 11c in the sill portion 1a with the inner wall plastic layer 11b of the front edge 1d1 in the center pillar portion 1d. The rib 17b on the rear side connects the outer wall plastic layer 11c in the sill portion 1a with the inner wall plastic layer 11b of the rear edge 1d2 in the center pillar portion 1d. Each of the plural straight ribs 17a and 17b has a tapered shape whose cross-sectional area becomes smaller on a side of the center pillar portion 1d as being distanced from the sill portion 1a.

The joint rib 19 has a curved shape so as to be concave toward the outer circumferential side of the outer panel 3 (downward in FIG. 3), and connects the plural straight ribs 17a and 17b with each other. The curved shape may be a portion of a circular shape or an ellipse, for example, and an inner side of the circular shape or the like associates with the outer circumferential side of the outer panel 3. End portions 19a and 19b on both front and rear sides of the joint rib 19 are connected with the outer wall plastic layer 11c of the sill portions 1a.

Figure 5:
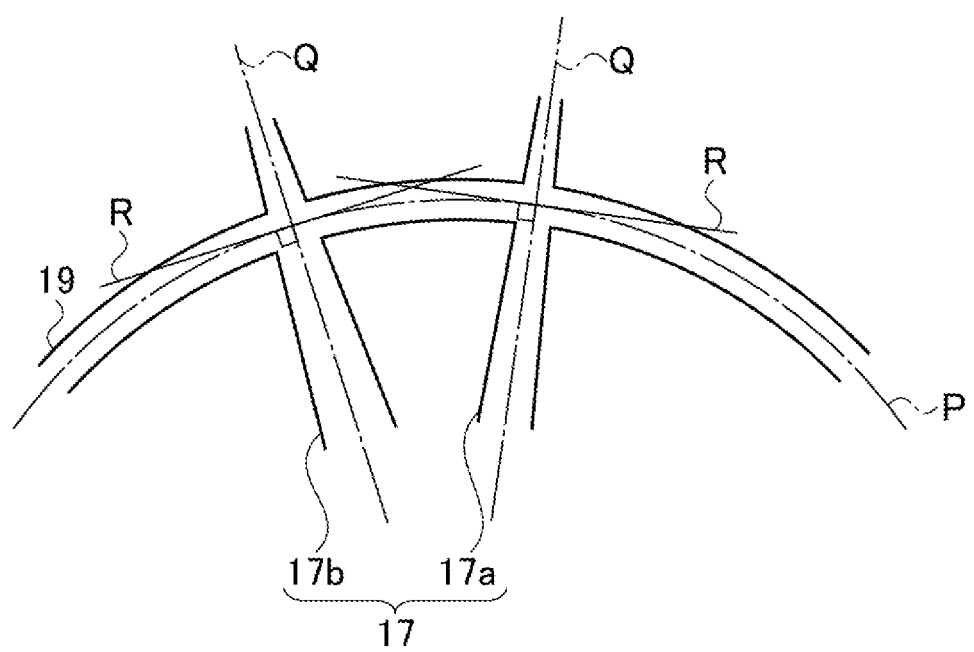
FIG. 5 is an explanatory diagram showing a state where a joint rib and straight ribs intersect at right angles to each other as shown in FIG. 3.

Each intersecting portions of the joint rib 19 and the straight ribs 17a and 17b intersects at a right angle as shown FIG. 5. Each intersecting structure of the joint rib 19 and the straight ribs 17a and 17b at a right angle is a case where, when a center curved line of the joint rib 19 is defined as P, each center straight line of the straight ribs 17a and 17b is defined as Q, a tangent line(s) at an intersecting portion(s) of the center curved line P and the center straight line(s) Q is defined as R, the center straight line(s) Q intersect with the tangent line(s) R at a right angle. In addition, the joint rib 19 intersects with the straight ribs 17a and 17b in a crossing manner or in a braced manner.

A horizontal joint rib 21 extending in the front-back direction of the vehicle is formed at a boundary portion between the sill portion 1a and the center pillar portion 1d. The horizontal joint rib 21 connects with the straight ribs 17a and 17b so as to intersect with them, and its both front and rear ends are jointed with the joint rib 19. The horizontal joint rib 21 positions almost in the same straight line with the inner wall plastic layer 11b in the sill portion 1a.

Figure 6:
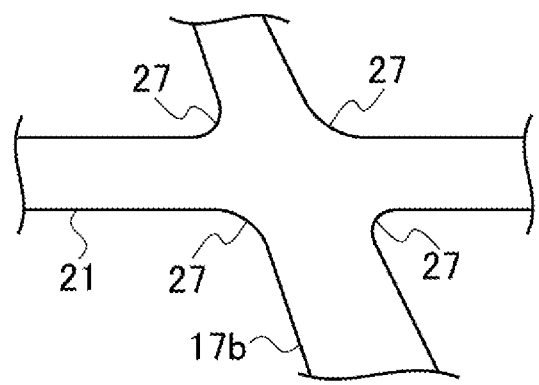
FIG. 6 is an explanatory diagram showing a rounded shape at an intersecting portion of a straight rib and a horizontal joint rib shown in FIG. 3.

Each intersecting portion of the ribs, e.g. the intersecting portion of the straight rib 17b and the horizontal joint rib 21 shown in FIG. 3, forms rounded portions 27 each having an R shape at its inner surfaces of four corners as shown in FIG. 6.

The rib structure 15B is composed of radiated ribs 23 and a joint rib 25. The radiated ribs 23 include plural (three, here) straight ribs 23a, 23b and 23c, and are radiated toward the center pillar portion 1d while originating from an upper end edge of the roof portion 1b above the center pillar portion 1d. The straight rib 23a extends toward a lower edge of the roof portion 1b at a corner portion between the center pillar portion 1d and the roof portion 1b while originating from the upper end edge of the roof portion 1b. The straight ribs 23b and 23c extend toward the front and rear edges 1d1 and 1d2 of the center pillar portion 1d, respectively, while originating from the upper end edge of the roof portion 1b. The upper end edge of the roof portion 1b as the originating point corresponds to the end edge portion of the outer panel 3 on its outer circumferential side.

The rib 23a on the front side among the plural straight ribs 23a, 23b and 23c connects the outer wall plastic layer 11c in the roof portion 1b with the inner wall plastic layer 11b near the roof portion 1b at the corner portion between the center pillar portion 1d and the roof portion 1b. The straight rib 23b on the center connects the outer wall plastic layer 11c in the roof portion 1b with the inner wall plastic layer 11b of the front edge 1d1 in the center pillar portion 1d. The straight rib 23c on the rear side connects the outer wall plastic layer 11c in the roof portion 1b with the inner wall plastic layer 11b of the rear edge 1d2 in the center pillar portion 1d.

The joint rib 25 has a curved shape such that the outer circumferential side (the upper side in FIG. 3) of the outer panel 3 is located on its inside, and connects the plural straight ribs 23a, 23b and 23c with each other. The curved shape may be a portion of a circular shape or an ellipse, for example, and an inner side of the circular shape or the like associates with the outer circumferential side of the outer panel 3. Each intersecting portion of the joint rib 25 and the straight ribs 23a, 23b and 23c intersects at a right angle similarly to the intersecting portions of the joint rib 19 and the straight ribs 17a and 17b of the rib structure 15A. In addition, the joint rib 25 intersects with the straight ribs 23b and 23c in a crossing manner or in a braced manner.

End portions 25a and 25b on both front and rear sides of the joint rib 25 are connected with the outer wall plastic layer 11c of the roof portion 1b. The joint rib 25 is connected with the inner wall plastic layer 11b of the roof portion 1b and with the inner wall plastic layer 11b of the center pillar portion 1d on its front side. The joint rib 25 is connected with the inner wall plastic layer 11b of the roof portion 1b and with the outer wall plastic layer 11c of the center pillar portion 1d on its rear side.

The rib structure 15C is composed of radiated ribs 29 and a joint rib 31. The radiated ribs 29 include plural (three, here) straight ribs 29a, 29b and 29c, and are radiated rearward while originating from a vicinity of a front end edge of the front pillar portion 1c. The plural straight ribs 29a, 29b and 29c connect the outer wall plastic layer 11c of the front pillar portion 1c with the inner wall plastic layer 11b of the front pillar portion 1c.

The rib 29a is oriented rearward and obliquely upward such that its extended line intersects with the roof portion 1b at the front door opening portion 1f. The rib 29b is oriented rearward and slightly obliquely upward such that its extended line intersects with the center pillar portion 1d. The rib 29c is oriented rearward and obliquely downward such that its extended line intersects with the sill portion 1a at the front door opening portion 1f. The vicinity of the front end edge of the front pillar portion 1c as the originating point corresponds to the end edge portion of the outer panel 3 on its outer circumferential side.

The joint rib 31 has a curved shape such that the outer circumferential side (the right side in FIG. 3) of the outer panel 3 is located on its inside, and connects the plural straight ribs 29a, 29b and 29c with each other. The curved shape may be a portion of a circular shape or an ellipse, for example, and an inner side of the circular shape or the like associates with the outer circumferential side of the outer panel 3. Each intersecting portion of the joint rib 31 and the straight ribs 29a, 29b and 29c intersects at a right angle similarly to the intersecting portions of the joint rib 19 and the straight ribs 17a and 17b of the rib structure 15A. In addition, the joint rib 31 intersects with the straight ribs 29a and 29b in a crossing manner or in a braced manner.

End portions 31a and 31b on both upper and lower sides of the joint rib 31 are connected with the outer wall plastic layer 11c of the front pillar portion 1c. The joint rib 31 is connected with the inner wall plastic layer 11b of the front pillar portion 1c between the ribs 29b and 29c on its rear side.

The rib structure 15D is composed of radiated ribs 33 and a joint rib 35. The radiated ribs 33 include plural (three, here) straight ribs 33a, 33b and 33c, and are radiated upward or rearward while originating from a vicinity of a rear end edge of the rear pillar portion 1e. The rear end edge of the rear pillar portion 1e corresponds to a portion that configures a wheel house. The vicinity of the rear end edge of the rear pillar portion 1e as the originating point corresponds to the end edge portion of the outer panel 3 on its outer circumferential side.

The rib 33a among the plural straight ribs 33a, 33b and 33c extends upward toward the roof portion 1b, and connects the outer wall plastic layer 11c of the rear pillar portion 1e with the outer wall plastic layer 11c of the roof portion 1b. The rib 33b extends toward a vicinity of the roof portion 1b in the center pillar portion 1d, and connects the outer wall plastic layer 11c of the rear pillar portion 1e with the inner wall plastic layer 11b of the rear pillar portion 1e. The rib 33c extends toward the sill portion 1a in the rear door opening portion 1g, and connects the outer wall plastic layer 11c of the rear pillar portion 1e with the inner wall plastic layer 11b of the sill portion 1a. Here, the rib 33c and the inner wall plastic layer 11b of the sill portion 1a form almost a straight line.

The joint rib 35 has a curved shape such that the outer circumferential side (the left side in FIG. 3) of the outer panel 3 is located on its inside, and connects the plural straight ribs 33a, 33b and 33c with each other. The curved shape may be a portion of a circular shape or an ellipse, for example, and an inner side of the circular shape or the like associates with the outer circumferential side of the outer panel 3. Each intersecting portion of the joint rib 35 and the straight ribs 33b and 33c among the radiated ribs 33 intersects at a right angle similarly to the intersecting portions of the joint rib 19 and the straight ribs 17a and 17b of the rib structure 15A. An intersection portion of the joint rib 35 and the rib 33a forms an angle that is almost a right angle. In addition, the joint rib 35 intersects with the straight ribs 33a and 33c in a crossing manner or in a braced manner.

End portions 35a and 35b on both upper and lower sides of the joint rib 35 are connected with the outer wall plastic layer 11c of the rear pillar portion 1e. The joint rib 35 is connected with the inner wall plastic layer 11b of the rear pillar portion 1e at a vicinity of the rib 33b between the ribs 33b and 33c.

The rib structure 15E is composed of radiated ribs 37 and a joint rib 39. The radiated ribs 37 include plural (three, here) straight ribs 37a, 37b and 37c, and are radiated downward while originating from a vicinity of an upper end edge of the roof portion 1b. The vicinity of the upper end edge of the roof portion 1b as the originating point corresponds to the end edge portion of the outer panel 3 on its outer circumferential side.

The plural straight ribs 37a, 37b and 37c extend downward, and connect the outer wall plastic layer 11c of the roof portion 1b with the inner wall plastic layer 11b of the roof portion 1b. The rib 37a inclines such that its lower end positions anterior to its upper end, and is connected with the inner wall plastic layer 11b of the roof portion 1b so as to approach it from rear to front. The rib 37b inclines such that its lower end positions posterior to its upper end, and is connected with the inner wall plastic layer 11b of the roof portion 1b almost at a right angle. The rib 37c inclines such that its lower end positions posterior to its upper end, and is connected with the inner wall plastic layer 11b of the roof portion 1b so as to approach it from front to rear.

The joint rib 39 has a curved shape such that the outer circumferential side (the upper side in FIG. 3) of the outer panel 3 is located on its inside, and connects the plural straight ribs 37a, 37b and 37c with each other. The curved shape may be a portion of a circular shape or an ellipse, for example, and an inner side of the circular shape or the like associates with the outer circumferential side of the outer panel 3. Each intersecting portion of the joint rib 39 and the straight ribs 37a, 37b and 37c intersects at a right angle similarly to the intersecting portions of the joint rib 19 and the straight ribs 17a and 17b of the rib structure 15A. In addition, the joint rib 39 intersects with the straight ribs 37a and 37c in a crossing manner or in a braced manner.

End portions 39a and 39b on both front and rear sides of the joint rib 39 are connected with the outer wall plastic layer 11c of the roof portion 1b. The joint rib 39 is connected with the inner wall plastic layer 11b of the roof portion 1b at a portion corresponding to the rib 37b between the ribs 37a and 37c.

The front door opening portion 1f forms concave curved surface portions 41, 43 and 45 at its lower portion on a side of the front pillar portion 1c and at its upper and lower portions on a side of the center pillar portion 1d, respectively. The inner wall plastic layer 11b at a vicinity of an upper end of the curved surface portion 41 is connected with the outer wall plastic layer 11c at an upper portion of the front pillar portion 1c by the joint rib 31 on a side of the end portion 31a of the rib structure 15C. The inner wall plastic layer 11b at a vicinity of a lower end of the curved surface portion 41 is connected with the outer wall plastic layer 11c of the sill portion 1a by a rib 47 provided within the sill portion 1a. The rib 47 extends rearward and downward from the vicinity of the lower end of the curved surface portion 41. In this case, an upper portion of the joint rib 31 and the rib 47 form a rib structure that continues along the surface of the outer panel 3 with the inner wall plastic layer 11b in the curved surface portion 41 interposed therebetween.

The inner wall plastic layer 11b in the curved surface portion 43 at a vicinity of its end portion on a side of the center pillar portion 1d is connected with the outer wall plastic layer 11c of the roof portion 1b by the straight rib 23b of the rib structure 15B. In this case, the straight rib 23b and the inner wall plastic layer 11b of the center pillar portion 1d form a rib structure that continues along the surface of the outer panel 3 with the inner wall plastic layer 11b in the curved surface portion 43 interposed therebetween.

The inner wall plastic layer 11b in the curved surface portion 45 at a vicinity of its end portion on a side of the center pillar portion 1d is connected with the inner wall plastic layer 11b of the sill portion 1a by the straight rib 17a of the rib structure 15C. In this case, the straight rib 17a and the inner wall plastic layer 11b of the center pillar portion 1d form a rib structure that continues along the surface of the outer panel 3 with the inner wall plastic layer 11b in the curved surface portion 45 interposed therebetween. Note that an inner face of a corner of an upper portion of the front door opening portion 1f on a side of the front pillar portion 1c may form a rib made of plastic as a concave curved surface portion from an end portion of the curved surface portion along the surface of the outer panel 3 toward an end edge portion of the outer panel 3 on its outer circumferential side.

The rear door opening portion 1g forms concave curved surface portions 48, 49 and 51 at its upper and lower portions on a side of the center pillar portion 1d and at its lower portion on a side of the rear pillar portion 1e, respectively. The outer wall plastic layer 11c in the curved surface portion 48 at a vicinity of its end portion on a side of the center pillar portion 1d is connected with the outer wall plastic layer 11c of the roof portion 1b by the straight rib 23c of the rib structure 15B. In this case, the straight rib 23c and the outer wall plastic layer 11c of the center pillar portion 1d form a rib structure that continues along the surface of the outer panel 3 with the outer wall plastic layer 11c in the curved surface portion 48 interposed therebetween. Note that a plastic layer in the curved surface portion 48 is the outer wall plastic layer 11c similarly to the center pillar portion 1d, here.

The outer wall plastic layer 11c in the curved surface portion 49 at a vicinity of its end portion on a side of the center pillar portion 1d is connected with the outer wall plastic layer 11c of the sill portion 1a by the straight rib 17b of the rib structure 15A. In this case, the straight rib 17b and the outer wall plastic layer 11c of the center pillar portion 1d form a rib structure that continues along the surface of the outer panel 3 with the outer wall plastic layer 11c in the curved surface portion 49 interposed therebetween. Note that a plastic layer in the curved surface portion 49 is the outer wall plastic layer 11c similarly to the center pillar portion 1d, here.

The outer wall plastic layer 11c at a vicinity of an upper end of the curved surface portion 51 is connected with the outer wall plastic layer 11c of the rear pillar portion 1e by the joint rib 35 on a side of the end portion 35a of the rib structure 15D. A vicinity of a lower end of the curved surface portion 51 is connected with the outer wall plastic layer 11c of the sill portion 1a by a rib 53 provided within the sill portion 1a. The rib 53 extends forward and downward from the vicinity of the lower end of the curved surface portion 51, and is connected with a vicinity of the end portion 19b of the joint rib 19 of the rib structure 15A. In this case, an upper portion of the joint rib 35 and the rib 53 form a rib structure that continues along the surface of the outer panel 3 with the inner wall plastic layer 11b in the curved surface portion 51 interposed therebetween. Note that an inner face of a corner of an upper portion of the rear door opening portion 1g on a side of the rear pillar portion 1e may form a rib made of plastic from an end portion of a curved surface portion along the surface of the outer panel 3 toward an end edge portion of the outer panel 3 on its outer circumferential side.

Ribs may be appropriately added to the body side panel 1 in addition to the rib structures 15A to 15E and the ribs 47 and 53 mentioned above in order to improve torsional rigidity and bending rigidity. But, the rib structures 15A to 15E occupy equal-to or more-than 50% of all the ribs. Determining positions for forming the ribs by using topological optimization can achieve further light-weighting.

Next, a load transfer mode in the body side panel 1 when a car provide with the above-explained body side panel 1 receives an impact load due to a crush or the like will be explained.

In a case where the car receive the impact load from its side, for example, when a vicinity of the rib structure 15A receives the load, the straight ribs 17a and 17b of the radiated ribs 17 receive a tensile load such that each of them is pulled in its longitudinal direction. The tensile load received by each of the radiated ribs 17 is transferred to the outer wall plastic layer 11c of the sill portion 1a at its lower portion, and transferred to the inner wall plastic layer 11b and the outer wall plastic layer 11c of the center pillar portion 1d at its upper portion.

According to this, the load from the side is transferred to the outer wall 3c including the outer wall plastic layer 11c of the sill portion 1a and to the inner wall 3b including the inner wall plastic layer 11b and the outer wall 3c including the outer wall plastic layer 11c of the center pillar portion 1d and then is dispersed to an entire of the body side panel 1, and thereby deformation of the body side panel 1 is restricted to improve its rigidity. Here, the joint rib 19 restricts each deformation of the radiated ribs 17 in a direction different from its longitudinal direction. Therefore, the radiated ribs 17 can exert their load transfer function efficiently.

Also with respect to the rib structures 15B to 15D, the car receive the impact load from its side, the tensile load received by the straight ribs of the radiated ribs 23, 29, 33 and 37 is transferred to other portions and then dispersed to an entire of the body side panel 1. The radiated ribs 23 transfer the load to the outer wall 3c including the outer wall plastic layer 11c of the roof portion 1b and to the inner wall 3b including the inner wall plastic layer 11b and the outer wall 3c including the outer wall plastic layer 11c of the center pillar portion 1d to disperse it. Here, the joint rib 25 restricts each deformation of the radiated ribs 23 in a direction different from its longitudinal direction. The radiated ribs 29 transfer the load to the inner wall 3b including the inner wall plastic layer 11b and the outer wall 3c including the outer wall plastic layer 11c of the front pillar portion 1c to disperse it. Here, the joint rib 31 restricts each deformation of the radiated ribs 29 in a direction different from its longitudinal direction.

The radiated ribs 33 transfer the load to the inner wall 3b including the inner wall plastic layer 11b and the outer wall 3c including the outer wall plastic layer 11c of the rear pillar portion 1e and to the outer wall 3c including the outer wall plastic layer 11c of the roof portion 1b to disperse it. Here, the joint rib 35 restricts each deformation of the radiated ribs 33 in a direction different from its longitudinal direction. The radiated ribs 37 transfer the load to the inner wall 3b including the inner wall plastic layer 11b of the roof portion 1b and to the outer wall 3c including the outer wall plastic layer 11c of the roof portion 1b to disperse it. Here, the joint rib 39 restricts each deformation of the radiated ribs 37 in a direction different from its longitudinal direction.

The generation of the tensile force by the radiated ribs 17, 23, 29, 33 and 37 and the restriction effect of the deformations of the radiated ribs 17, 23, 29, 33 and 37 by the joint ribs 19, 25, 31, 35 and 39 can be compared to a spider web. The spider web is fundamentally composed of radiated strings extending radially from its center and almost coaxial circular strings that joint the radiated strings. In this case, when a force acts on the center of the spider web, each of the radiated strings deforms so as to be pulled in its longitudinal direction while receiving a tensile force in its longitudinal direction, and each of the circular strings restricts deformations of the eradiated strings in a direction different from the direction of the generation of the tensile force.

In a case where a car receives an impact load from its front, the rib structure 15C disperses the impact load in the body side panel 1. The impact load from the front is received by the straight ribs 29a, 29b and 29c of the radiated ribs 29 such that they are compressed along its longitudinal directions. The compressing load received by the radiated ribs 29 is transferred to the inner wall 3b including the inner wall plastic layer 11b of the front pillar portion 1c. The load received by the upper straight rib 29a among them is transferred to the roof portion 1b, and the load received by the lower straight rib 29c is transferred to the sill portion 1a. Here, the joint rib 31 receives the load transfer, and restricts deformation of the radiated ribs 29 in a direction different from the compressing direction.

In this manner, the impact load received from the front is transferred and dispersed to an entire of the body side panel 1 through the roof portion 1b and the sill portion 1a. According to this, deformation of the body side panel 1 is restricted and its rigidity is improved.

In a case where a car receives an impact load from its rear, the rib structure 15D disperses the impact load in the body side panel 1. The impact load from the rear is received by the straight ribs 33b and 33c of the radiated ribs 33 such that they are compressed along its longitudinal directions. There may be a case the rib 33a receives a tensile load. The load received by the upper rib 33a is transferred to the outer wall 3c including the outer wall plastic layer 11c of the roof portion 1b. The load received by the center rib 33b is transferred to the inner wall 3b including the inner wall plastic layer 11b of the rear pillar portion 1e. The load received by the lower rib 33c is transferred to the sill portion 1a. Here, the joint rib 35 receives the load transfer, and restricts deformation of the radiated ribs 33 in a direction different from the compressing direction.

In this manner, the impact load received from the rear is transferred and dispersed to an entire of the body side panel 1 through the roof portion 1b and the sill portion 1a. According to this, the deformation of the body side panel 1 is restricted and its rigidity is improved.

In a case where the roof portion 1b receives a crush load, for example when a car rolls over, the rib structures 15B and 15E disperse the impact load in the body side panel 1. In the rib structure 15B, the compressing load is received by the straight ribs 23a, 23b and 23c of the radiated ribs 23 such that they are compressed along its longitudinal directions. The load received by the front straight rib 23a among them is transferred to the inner wall 3b including the inner wall plastic layer lib of the roof portion 1b. The load received by the center rib 23b is transferred to the inner wall 3b including the inner wall plastic layer 11b of the center pillar portion 1d. The load received by the rear rib 23c is transferred to the outer wall 3c including the outer wall plastic layer 11c of the center pillar portion 1d. Here, the joint rib 25 receives the load transfer, and restricts deformation of the radiated ribs 23 in a direction different from the compressing direction.

In this manner, the crush load received by the roof portion 1*b* in the rib structure 15C is transferred and dispersed to an entire of the body side panel 1 through the front section of the roof portion 1*b* and the center pillar portion 1*d* by the rib structure 15B.

In the rib structure 15E, the compressing load is received by the straight ribs 37*a*, 37*b* and 37*c* of the radiated ribs 37 such that they are compressed along its longitudinal directions when the roof portion 1*b* receives the crush load. The load received by the radiated ribs 37 is transferred to the inner wall 3*b* including the inner wall plastic layer 11*b* of the roof portion 1*b*. The load received by the front rib 37*a* among them is transferred to an anterior portion of the roof portion 1*b* to a position directly receiving the compressing load and to the front pillar portion 1*c*, and the load received by the center and rear ribs 37*b* and 37*c* is transferred to a posterior portion of the roof portion 1*b* to the position directly receiving the compressing load and to the center pillar portion 1*d*. Here, the joint rib 39 receives the load transfer, and restricts deformation of the radiated ribs 37 in a direction different from the compressing direction.

In this manner, the crush load received by the roof portion 1*b* in the rib structure 15E is transferred and dispersed to an entire of the body side panel 1 through the front pillar portion 1*c* and the center pillar portion 1*d*. According to this, the deformation of the body side panel 1 is restricted and its rigidity is improved. Note that a rib structure equivalent to the rib structure 15E may be provided in the roof portion 1*b* between the center pillar portion 1*d* and the rear pillar portion 1*e*. In this case, the load received by the rib structure is dispersed to the center pillar portion 1*d* and the rear pillar portion 1*e*.

Next, functions and effects by the present embodiment will be explained.

The present embodiment is provided with the outer panel 3 and the plastic portion 7 that is integrally-molded on the outer panel 3 to reinforce the outer panel 3. In the rib structure 15A, the plastic portion 7 has the plural straight ribs 17*a* and 17*b* formed radially from the end edge portion of the outer panel 3 on its outer circumferential side along the surface of the outer panel 3 and the joint rib 19 that connects the plural straight ribs 17*a* and 17*b* so as to intersect with them. Each of the rib structures 15B to 15E has a similar structure to that of the rib structure 15A.

In this case, when the radiated ribs 17 composed of the plural straight ribs 17*a* and 17*b* receive the impact load, the load is dispersed in the body side panel 1 and the joint rib 19 efficiently restricts each deformation of the radiated ribs 17 in a direction different from the load transfer direction. Here, grid-like ribs are not provided on an entire surface of the sill portion 1*a* and the center pillar portion 1*d*, for example. Therefore, the body side panel 1 can achieve its light-weighting by reducing a used amount of the plastics as much as possible while ensuring its rigidity. Since the rigidity can be ensured, the outer panel 3 and the inner panel 5 can be made thin.

Each of the straight ribs 17*a* and 17*b* of the radiated ribs 17 exerts its effect best when the load is input along its longitudinal direction while its deformation in its lateral direction intersecting with the longitudinal direction is restricted. However, each of the straight ribs 17*a* and 17*b* may receive a force acting in a direction for deforming it in the lateral direction when the load is input in a direction that is not corresponds to the longitudinal direction. In such a case, the joint rib 19 restricts the straight ribs 17*a* and 17*b* from deforming in the lateral direction. The same functions and effects can be brought by the rib structures 15B to 15E as those by the rib structure 15A.

The joint rib 19, 25, 31, 35 or 39 in the present embodiment has the curved shape so as to be concave toward the outer circumferential side of the outer panel 3. Therefore, the plural straight ribs 17*a* and 17*b* or the like of the radiated ribs 17, 23, 29, 33 or 37 can be made intersected with the joint rib 19, 25, 31, 35 or 39 at a right angle. Since the joint rib 19, 25, 31, 35 or 39 intersects with the associating straight ribs, rigidity of the ribs can be improved. Note that the straight ribs are not necessarily intersected with and the joint rib 19, 25, 31, 35 or 39 at a right angle.

The joint rib 19, 25, 31, 35 or 39 in the present embodiment intersects with at least one of the plural straight ribs in a crossing manner or in a braced manner. According to this, the rigidity of the rib structure composed of the joint rib 19, 25, 31, 35 or 39 and the radiated ribs 17, 23, 29, 33 or 37, i.e. the rigidity of the combination of the joint rib and the straight ribs, can be improved further.

The radiated ribs 17 and the joint rib 19 in the rib structure 15A of the present embodiment are provided at the lower portion of the center pillar portion 1*d*. In this case, the impact load received from the side (the side impact load) acting on the lower portion of the center pillar portion 1*d* can be dispersed to an entire of the body side panel 1 by the rib structure 15A. The rigidity of the body side panel 1 required against the side impact load acting on the lower portion of the center pillar portion 1*d* can be ensured with a minimum essential amount of the plastics by the rib structure 15A.

The radiated ribs 23 and the joint rib 25 in the rib structure 15B of the present embodiment are provided at the upper portion of the center pillar portion 1*d*. In this case, the impact load from the side (the side impact load) acting on the upper portion of the center pillar portion 1*d* can be dispersed to an entire of the body side panel 1 by the rib structure 15B. The rigidity of the body side panel 1 required against the side impact load acting on the upper portion of the center pillar portion 1*d* can be ensured with a minimum essential amount of the plastics by the rib structure 15B.

The radiated ribs 29 and the joint rib 31 in the rib structure 15C of the present embodiment are provided at the front portion of the body side panel 1. In this case, the impact load received from the front (the frontal impact load) can be dispersed to an entire of the body side panel 1 by the rib structure 15C. The rigidity of the body side panel 1 required against the frontal impact load acting on the front end portion of the car can be ensured with a minimum essential amount of plastics by the rib structure 15C.

The radiated ribs 29 in the rib structure 15C of the present embodiment are formed so as to extend from the front end portion of the body side panel 1 toward the sill portion 1*a* located at its lower portion and toward the roof portion 1*b* located at its upper portion. In this case, the impact load received from the front can be transferred to the sill portion 1*a* and the roof portion 1*b* by the rib structure 15C, and thereby it becomes possible to restrict the load acting on a passenger compartment while reducing the rigidity required for the passenger compartment as much as possible and to get the rigidity of the body side panel 1 for the occupant protection.

The radiated ribs 33 and the joint rib 35 in the rib structure 15D of the present embodiment are provided at the rear portion of the body side panel. In this case, the impact load received from the rear (the rear impact load) can be dispersed to an entire of the body side panel 1 by the rib structure 15D. The rigidity of the body side panel 1 required against the rear impact load acting on the rear end portion of the car can be ensured with a minimum essential amount of plastics by the rib structure 15D.

The radiated ribs 33 in the rib structure 15D of the present embodiment are formed so as to extend from the rear end portion of the body side panel 1 toward the sill portion 1*a* located at its lower portion and toward the roof portion 1*b* located at its upper portion. In this case, the impact load received from the rear can be transferred to the sill portion 1*a* and the roof portion 1*b* by the rib structure 15D, and thereby it becomes possible to restrict the load acting on the passenger compartment and to get the rigidity of the body side panel 1 for the occupant protection while reducing the rigidity required for the passenger compartment as much as possible.

The radiated ribs 37 and the joint rib 39 in the rib structure 15E of the present embodiment are provided in the roof portion 1*b* located above the front door opening portion 1*f*, and the radiated ribs 37 are formed so as to extend toward the front pillar portion 1*c* located on the front side of the front door opening portion 1*f* and toward the center pillar portion 1*d* located on the rear side thereof. In this case, the crush load received due to the rollover of the vehicle can be dispersed to an entire of the body side panel 1 by the rib structure 15E. The rigidity of the body side panel 1 required against the roof crush load can be ensured with a minimum essential amount of the plastics by the rib structure 15E.

In the present embodiment, the corner portions of the front door opening portion 1*f* and the rear door opening portion 1*g* are formed as the concave curved surface portions 41, 43 and 45, and 48, 49 and 51. Here, with respect to the front door opening portion 1*f*, the joint rib 31 and the rib 47 are formed by the plastic portion 7 along the surface of the outer panel 3 from the end portions of the curved surface portion 41 toward the end edge portions of the front pillar portion 1*c* and the sill portion 1*a* on the outer circumferential side thereof, respectively. The rib 23*b* and the inner wall plastic layer 11*b* of the center pillar portion 1*d* are formed along the surface of the outer panel 3 from the end portion of the curved surface portion 43 toward the end edge portion of the roof portion 1*b* on the outer circumferential portion thereof and toward the end edge portion of the center pillar portion 1*d* on the side of the front door opening portion 1*f*. The rib 17*a* and the inner wall plastic layer 11*b* of the center pillar portion 1*d* are formed along the surface of the outer panel 3 from the end portion of the curved surface portion 45 toward the end edge portion of the sill portion 1*a* on the outer circumferential portion thereof and toward the end edge portion of the center pillar portion 1*d* on the side of the front door opening portion 1*f*.

On the other hand, with respect to the rear door opening portion 1*g*, the rib 23*c* and the outer wall plastic layer 11*c* of the center pillar portion 1*d* are formed along the surface of the outer panel 3 from the end portion of the curved surface portion 48 toward the end edge portion of the roof portion 1*b* on the outer circumferential side thereof and toward the end edge portion of the center pillar portion 1*d* on the side of the rear door opening portion 1*g*. The rib 17*b* and the outer wall plastic layer 11*c* of the center pillar portion 1*d* are formed along the surface of the outer panel 3 from the end portion of the curved surface portion 49 toward the end edge portion of the sill portion 1*a* on the outer circumferential portion thereof and toward the end edge portion of the center pillar portion 1*d* on the side of the rear door opening portion 1*g*. The joint rib 35 and the rib 53 are formed by the plastic portion 7 along the surface of the outer panel 3 from the end portions of the curved surface portion 51 toward the end edge portions of the rear pillar portion 1*e* and the sill portion 1*a* on the outer circumferential side thereof, respectively.

As explained above, the radiated rib 17 or 23, the joint rib 31 or 35, or the rib 47 or 53 is formed from the end portion of the curved surface portion 41, 43 or 45, or 48, 49 or 51 of the corner portion of the front door opening portion 1*f* or the rear door opening portion 1*g* toward the end edge portion of the body side panel 1 on its outer circumferential side in the present embodiment. Here, the load acting on the front door or the rear door is transferred to an entire circumferential edge of the front door opening portion 1*f* or the rear door opening portion 1*g*. At that moment, the load can be dispersed to the outer circumferential edge portion of the body side panel 1 by the joint rib 31 or 35, the straight rib 17*a*, 17*b*, 23*b* or 23*c*, or the rib 47 or 53 at the above-explained curved surface portion 41, 43, 45, 48, 49 or 51, and thereby the rigidity against the load input into the door(s) can be also ensured.

In the present embodiment, the straight ribs 17*a* and 17*b* of the radiated ribs 17 in the rib structure 15A is formed such that each cross-sectional area thereof becomes gradually smaller as being distanced from the end edge portion of the sill portion 1*a* on the outer circumferential side thereof. The load acting on a vicinity of the end of the straight rib 17*a* or 17*b* whose cross-sectional area is large becomes smaller as being inward of the body side panel 1. Therefore, an amount of plastics is reduced as much as possible by reducing the cross-sectional area as being inward (being closer to the distal end of the straight rib 17*a* or 17*b*) according to the required rigidity, and thereby light-weighting can be achieved. Note that, with respect to the straight rib(s) in each of the radiated ribs 23, 29, 33 and 37 in the rib structures 15B to 15E may be also formed such that its cross-sectional area becomes gradually smaller as being distanced from the end edge portion of the side body panel 1 on the outer circumferential side thereof.

In the present embodiment, the intersecting portion of the rib 17*b* in the radiated ribs 17 and the horizontal joint rib 21 forms the rounded portions 27 made by making the corners rounded by using the plastics. According to this, the ribs can be jointed firmly to each other. Note that the rounded corners made by using the plastics may be formed at the intersecting portion of the other ribs.

In the present embodiment, the plastic layers 11 are formed on the surface of the outer panel 3 and the radiated ribs 17, 23, 29, 33 and 37 and the joint ribs 19, 25, 31, 35 and 39 are integrally-molded on the plastic layers 11. Since the radiated ribs 17, 23, 29, 33 and 37 and the joint ribs 19, 25, 31, 35 and 39 are jointed with each other by the plastic layers 11, they are in a firmly jointed state with respect to the outer panel 3 and thereby they can surely exert their function as ribs.

The plastic portion 7 in the present embodiment is made of thermoplastic resin and contains reinforcing carbon fibers. By using the thermoplastic resin, it becomes possible to fill a molding die with the resin and the fibers that have been mixed up and are in a semisolid state and then carry out press molding. Since the resin and the fibers in this case don't pass through a nozzle differently from injection molding, discontinuous long fibers (about 1 mm to 10 mm) that are relatively long can be used as the fibers. If the resin and the fibers have to pass through a nozzle, the fibers may be shredded into discontinuous short fibers (about 0.1 mm to 1 mm). The rigidity of the plastic portion 7 can be improved by using them as the discontinuous long fibers compared with by using them as the discontinuous short fibers, and thereby the rigidity of the body side panel 1 can be improved. Note that the plastic portion 7 is not limited to be made of thermoplastic resin, but may be made of thermosetting resin.

Injection press molding is also possible by injecting the plastics into a molding die within which the outer panel 3 has been set. By the injection press molding, it becomes possible to integrally-mold the plastic portion 7 on the outer panel 3 within a short period, and thereby flexibility of shapes of the ribs can be also improved. In the injection press molding, a following method may be done: CFRP pellets made by preliminarily mixing plastics and carbon fibers are supplied to an injection press molding machine and then they are melted by being heated, or plastic pellets and continuous carbon fibers are directly supplied to an injection press molding machine and then they are mixed by a screw while being heated to shred the fibers into the discontinuous fibers.

Note that the carbon fibers may be any of regular tow and large tow. The carbon fibers may be recycled materials or non-woven cloth. Grass fibers may be used instead of the carbon fibers to the extent so that they ensure the rigidity of the body side panel 1.

The reinforcing carbon fibers in the present embodiment are oriented such that their longitudinal direction corresponds to a perpendicular direction, as an intersecting direction, with respect to a height direction of the ribs 13, such as radiated ribs 17, 23, 29, 33 and 37 and the joint ribs 19, 25, 31, 35 and 39, from the surface of the outer panel 3.

Figure 7A:
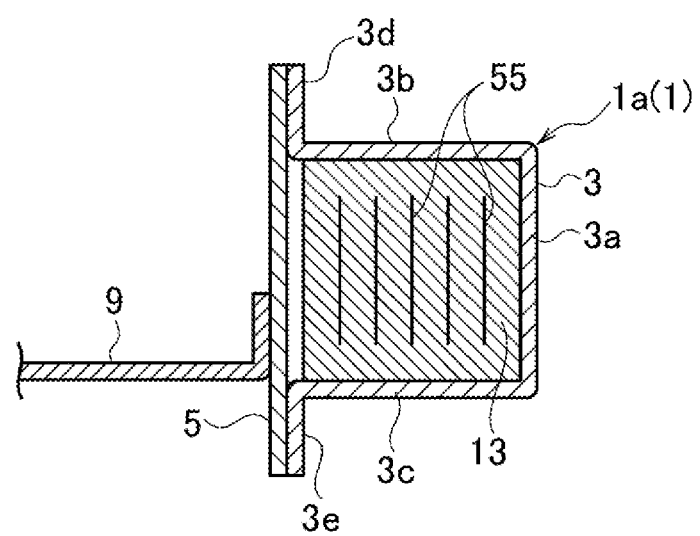
FIG. 7A is a cross-sectional view showing one example of a state where reinforcing carbon fibers are oriented in a direction perpendicular to a height direction of a rib.
Figure 7B:
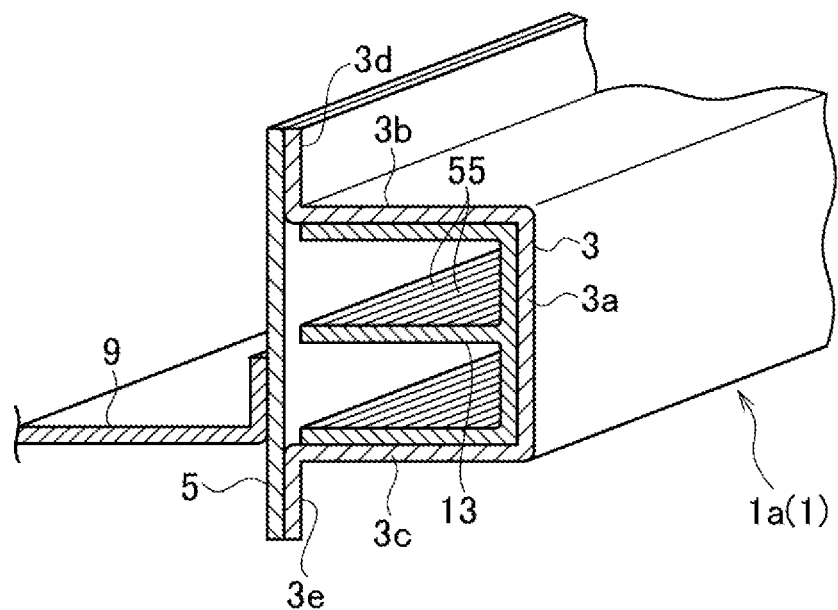
FIG. 7B is a perspective view showing another example of a state where reinforcing carbon fibers are oriented in a direction perpendicular to a height direction of a rib.

For example, with respect to the rib 13 shown in FIG. 7A, a left-right direction in the figure is the height direction of the rib 13, and the reinforcing carbon fibers 55 are oriented in an up-down direction in the figure. The rib 13 shown in FIG. 7A is coherent with the inner surfaces of the side wall 3a, the inner wall 3b and the outer wall 3c of the outer panel 3, and has a plate shape with a constant thickness in a direction perpendicular to a paper plane of the figure. In this case, when the outer panel 3 receives an impact load (a side impact load) from a right side in FIG. 7A (an outside in the vehicle width direction), the rigidity of the rib 13 is ensured by the reinforcing carbon fibers 55 oriented in a direction perpendicular to the height direction of the rib 13. Note that, in a case where a rib 13 extends in a direction perpendicular to a cross-sectional plane as shown in FIG. 7B, the reinforcing carbon fibers 55 are oriented in the direction perpendicular to the cross-sectional plane similarly to the rib 13. Also in the example shown in FIG. 7B, the longitudinal direction of the reinforcing carbon fibers 55 corresponds to the direction perpendicular to the height direction of the rib 13.

In the body side panel 1 in the present embodiment, the inner panel 5 that serves as a second metal panel is fixed with the outer panel 3 on which the plastic portion 7 is integrally-molded. Since the rigidity of an entire of the body side panel 1 is improved by the inner panel 5 in this case, an amount of the plastics is further reduced compared with a case where the inner panel 5 is not provided.

In the present embodiment, the metal panel on which the plastic portion 7 is integrally-molded is the outer panel 3 and the second metal panel is the inner panel 5, and the plastic portion 7 is provided on the portion of the outer panel 3 that faces to the inner panel 5. In this case, the rigidity can be ensured by receiving the load from the side of the vehicle by the outer panel 3 and the plastic portion 7.

Second Embodiment

Figure 8:
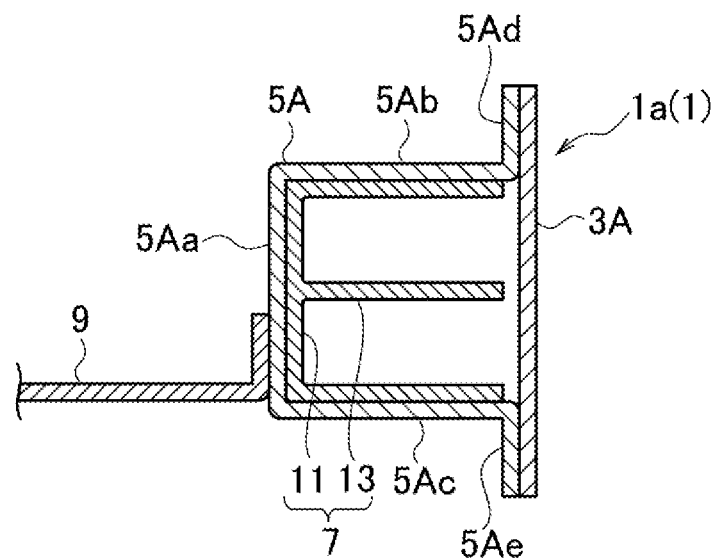
FIG. 8 is a cross-sectional view, corresponding to FIG. 4, according to a second embodiment.

FIG. 8 is a cross-sectional view according to a second embodiment that corresponds to FIG. 4. In the second embodiment, an outer panel 3A has almost a flat panel shape similar to the inner panel 5 shown in FIG. 4, and an inner panel 5A has a shape almost similar to that of the outer panel 3 shown in FIG. 4. In other words, the inner panel 5A includes, in the sill portion 1a, a side wall 5Aa that positions on an opposite side to the outer panel 3A, an inner wall 5Ab that extends from one end portion (an upper end in FIG. 8) of the side wall 5Aa toward the outer panel 3A, and an outer wall 5Ac that extends from the other end portion (an lower end in FIG. 8) of the side wall 5Aa toward the outer panel 3A.

An inner flange 5Ad protrudes from an end portion of the inner wall 5Ab on a side of the outer panel 3A toward the front door opening portion if (upward in FIG. 8), and an outer flange 5Ae protrudes from an end portion of the outer wall 5Ac on the side of the outer panel 3A toward an outside of the front door opening portion if (downward in FIG. 8).

The outer panel 3A and the inner panel 5A are integrated with each other by adjoining the inner and outer flanges 5Ad and 5Ae of the inner panel 5A to the outer panel 3A by welding. The floor panel 9 is adjoined to the inner panel 5A by welding to be fixed therewith on an opposite side to the outer panel 3A. Note that, with respect to each of the roof portion 1b and the front, center and rear pillar portions 1c, 1d and 1e, the inner panel 5A basically includes a side wall, an inner wall, an outer wall, and an inner flange and an outer flange similarly to the cross-sectional shape of the sill portion 1a.

The plastic portion 7 is integrally-molded on a portion of the inner panel 5A that faces to the outer panel 3A, and includes the plastic layers 11 and the ribs 13 similarly to the plastic portion 7 shown in FIG. 4.

In the present embodiment, the metal panel on which the plastic portion 7 is integrally-molded is the inner panel 5A and the second metal panel is the outer panel 3A, and the plastic portion 7 is provided on the portion of the outer panel 3 that faces to the inner panel 5. Since sink marks that occur while molding the plastic portion 7 may be formed on a side of the inner panel 5A in this case, degradation of appearance quality of a painted surface i.e. an outer surface of the outer panel 3A can be prevented.

The present embodiment is provided with the inner panel 5A and the plastic portion 7 that is integrally-molded on the inner panel 5A to reinforce the inner panel 5A. In the rib structures 15A to 15E, the plastic portion 7 has the radiated ribs 17, 23, 29, 33 and 37 each of which serves as a first rib that disperses an input load radially, and the joint ribs 19, 25, 31, 35 and 39 each of which serves as a second rib that receives the load input to the radiated ribs to restrict deformations of the radiated ribs.

In this case, when the radiated ribs 17, 23, 29, 33 and 37 receive the impact load, the load is dispersed in the body side panel 1 and the joint ribs 19, 25, 31, 35 and 39 restricts the radiated ribs from deforming efficiently. Here, grid-like ribs are not provided on an entire surface of the sill portion 1a and the center pillar portion 1d, for example. Therefore, the body side panel 1 can achieve its light-weighting by reducing a used amount of the plastics as much as possible while ensuring its rigidity. Since the rigidity can be ensured, the outer panel 3A and the inner panel 5A can be made thin.

Figure 9:
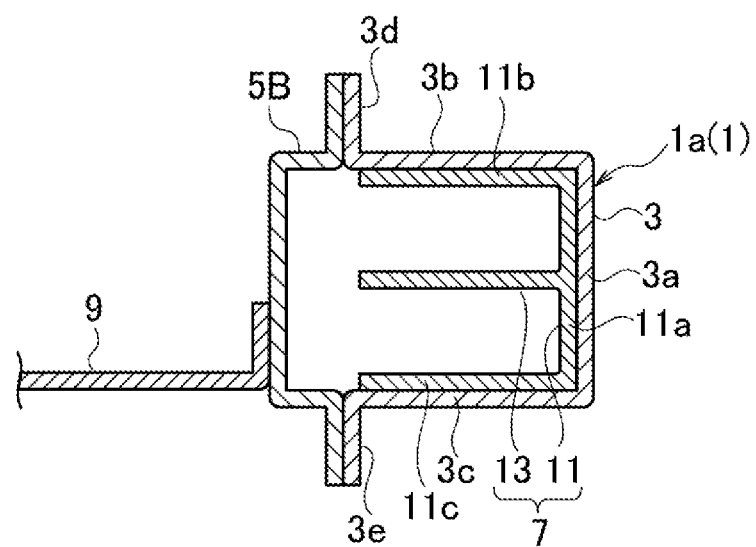
FIG. 9 is a cross-sectional view showing a modified example with respect to FIG. 4.

FIG. 9 shows a modified example with respect to FIG. 4, and an inner panel 5B has a cross-sectional hat shape, by being changed from the flat plate shape shown in FIG. 4. By forming the inner panel 5B to have the cross-sectional hat shape, the rigidity of the body side panel 1 can be improved and a used amount of the plastic can be reduced compared with the example shown in FIG. 4.

Third Embodiment

Figure 10:
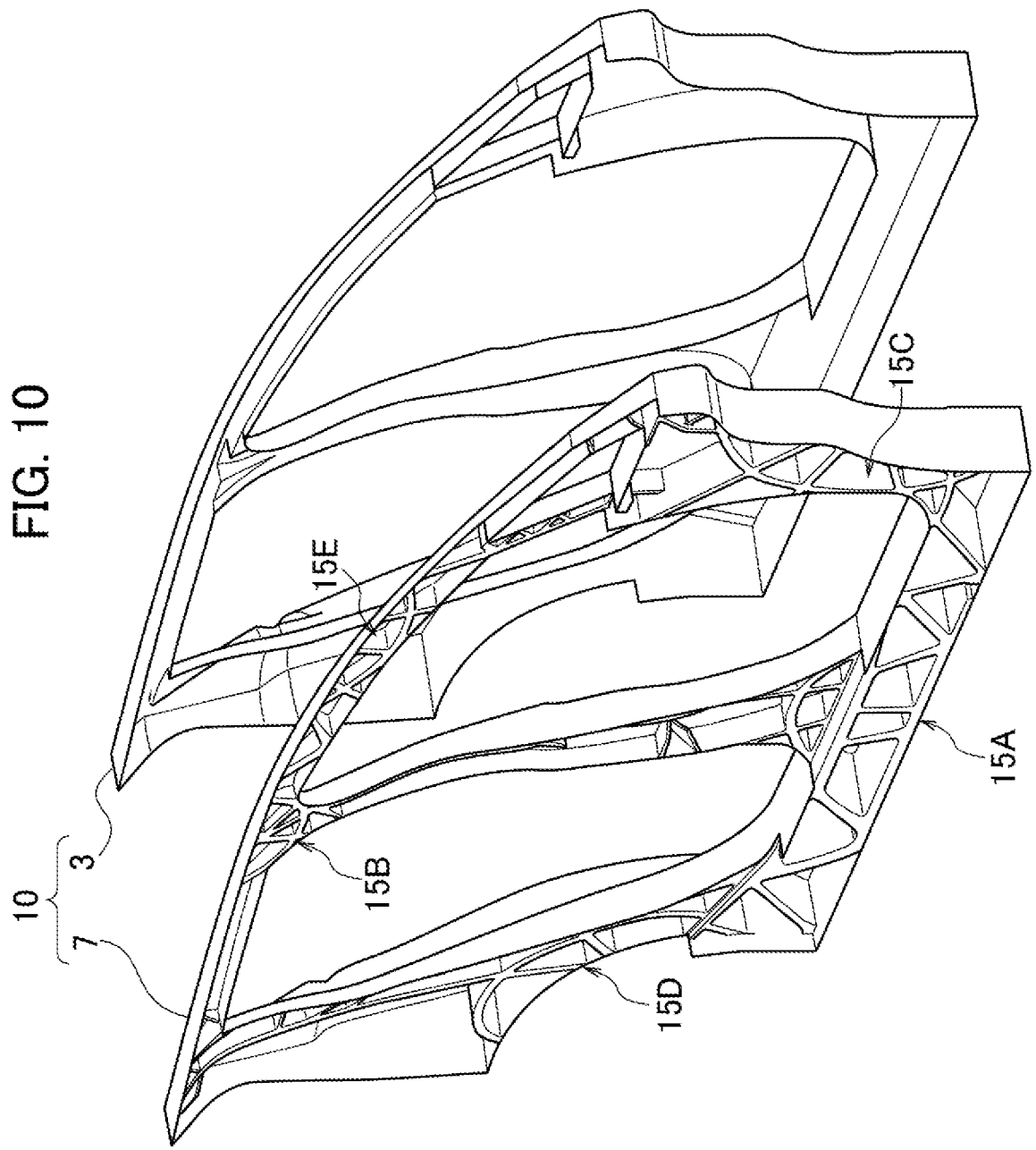
FIG. 10 is an exploded perspective view showing a body side panel of an automobile according to a third embodiment.
Figure 11:
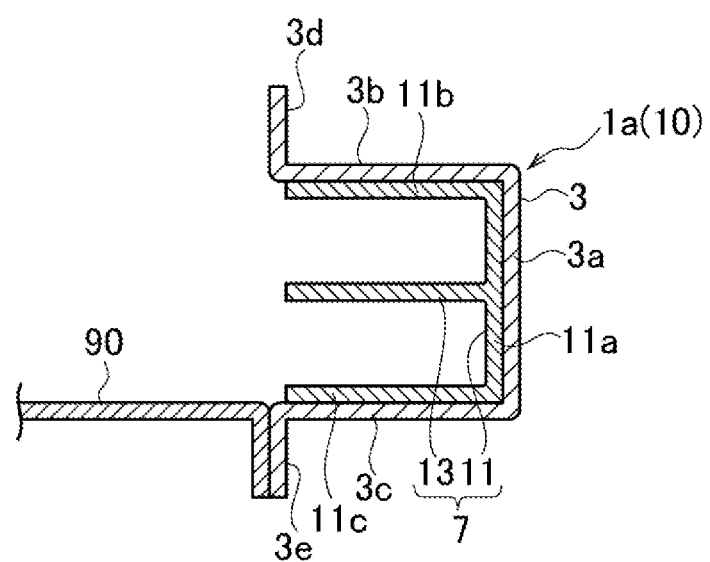
FIG. 11 is a cross-sectional view, corresponding to FIG. 4, of the body side panel shown in FIG. 10.

FIG. 10 shows a body side panel 10 of an automobile according to a third embodiment. The body side panel 10 doesn't use the inner panel 5 compared with the body side panel 1 of the first embodiment shown in FIG. 2. In other words, the plastic portion 7 is integrally-molded on the outer panel 3 on a side of the passenger compartment. As shown in FIG. 11, a floor panel 90 is adjoined to the outer flange 3e of the outer panel 3 by welding in this case.

Since the plastic portion 7 includes the rib structures 15A to 15E also in the body side panel 10 of the third embodiment, light-weighting can be achieved by reducing a used amount of the plastics as much as possible while ensuring its rigidity.

The embodiments of the present invention are explained above, but these embodiments are mere examples each only indicated in order to understand the present invention easily and the present invention is not limited to the embodiments. The technical scope of the present invention is not limited to the specific technical features disclosed in the embodiments and may include various modifications, revisions and alternative techniques that are to be introduced easily by them.

REFERENCE SIGNS LIST 1 body side panel
1b roof portion
1c front pillar portion
1d center pillar portion
1e rear pillar portion
1f front door opening portion
1g rear door opening portion
3 outer panel (metal panel)
3A outer panel (second metal panel)
5, 5B inner panel (second metal panel)
5A inner panel (metal panel)
7 plastic portion
11 plastic layer (plastic portion)
13 rib (plastic portion)
17, 23, 29, 33, 37 radiated rib (first rib)
17a, 17b, 23a, 23b, 23c, 29a, 29b, 29c, 33a, 33b, 33c, 37a, 37b, 37c straight rib
19, 25, 31, 35, 39 joint rib (second rib)
41, 43, 45 curved surface portion (of the front door opening portion)
47, 53 rib
48, 49, 51 curved surface portion (of the rear door opening portion)
55 reinforcing carbon fiber

The invention claimed is:

1. A body side panel comprising:
a metal panel; and
plastics that are integrally-molded on the metal panel, wherein the plastics have a plurality of straight ribs that are formed radially from an end edge portion of the metal panel on an outer circumferential side of the metal panel along a surface of the metal panel and a joint rib that joints the plurality of straight ribs so as to intersect with the plurality of straight ribs, and
the joint rib has a curved shape so as to intersect with the plurality of straight ribs at a right angle.

2. The body side panel according to claim 1, wherein the curved shape is concave toward a side of the end edge portion of the metal panel.

3. The body side panel according to claim 1, wherein the plurality of straight ribs and the joint rib are provided at a lower portion of a center pillar.

4. The body side panel according to claim 1, wherein the plurality of straight ribs and the joint rib are provided at an upper portion of a center pillar.

5. The body side panel according to claim 1, wherein
the plurality of straight ribs and the joint rib are provided at a front portion of the body side panel.

6. The body side panel according to claim 5, wherein
the plurality of straight ribs comprises a first straight rib and a second straight rib,
the first straight rib extends from the front portion of the body side panel toward a sill portion located at a lower portion of the body side panel, and
the second straight rib extends from the front portion of the body side panel toward a roof portion located at an upper portion of the body side panel.

7. The body side panel according to claim 1, wherein
the plurality of straight ribs and the joint rib are provided at a rear portion of the body side panel.

8. The body side panel according to claim 7, wherein
the plurality of straight ribs comprises a first straight rib and a second straight rib,
the first straight rib extends from the rear portion of the body side panel toward a sill portion located at a lower portion of the body side panel, and
the second straight rib extends from the front portion of the body side panel toward a roof portion located at an upper portion of the body side panel.

9. The body side panel according to claim 1, wherein
the plurality of straight ribs and the joint rib are provided in a roof portion above a door opening portion, and
the plurality of straight ribs comprises a first straight rib and a second straight rib,
the first straight rib extends from an upper portion of the roof portion toward a first pillar on a front side of the door opening portion, and
a second straight rib extends from the upper portion of the roof portion toward a second pillar on a rear side of the door opening portion.

10. The body side panel according to claim 1, wherein
a corner portion of a door opening portion is formed as a concave curved surface portion, and
any one of the straight ribs and the joint rib is formed from an end portion of the curved surface portion toward an end edge portion of the metal panel on an outer circumferential side of the metal panel along the surface of the metal panel.

11. The body side panel according to claim 1, wherein
a corner portion of a door opening portion is formed as a concave curved surface portion, and
a rib made of the plastics is formed from an end portion of the curved surface portion toward an end edge portion of the metal panel on an outer circumferential side of the metal panel along the surface of the metal panel.

12. The body side panel according to claim 1, wherein
the straight ribs are formed such that a cross-sectional area thereof becomes smaller as being distanced from the end edge portion of the metal plate on the outer circumferential side of the metal panel.

13. The body side panel according to claim 1, wherein intersecting portions of the joint rib and the straight ribs form rounded portions made by the plastics.

14. The body side panel according to claim 1, wherein
a plastic layer made by the plastics is formed on the surface of the metal panel, and
the straight ribs and the joint rib are integrally-molded on a surface of the plastic layer.

15. The body side panel according to claim 1, wherein
the plastics are thermoplastic resin and contain reinforcing fibers.

16. The body side panel according to claim 15, wherein
the reinforcing fibers are oriented such that a longitudinal direction of the reinforcing fibers corresponds to a direction intersecting with a height direction of any one of the straight ribs and the joint ribs from the surface of the metal panel.

17. The body side panel according to claim 1, wherein
a second metal panel is fixed with the metal panel on which the plastics are integrally- molded.

18. The body side panel according to claim 17, wherein
the metal panel on which the plastics are integrally-molded is an outer panel and the second metal panel is an inner panel, and
the plastics are provided on a portion of the outer panel that faces to the inner panel.

19. The body side panel according to claim 17, wherein
the metal panel on which the plastics are integrally-molded is an inner panel and the second metal panel is an outer panel, and
the plastics are provided on a portion of the inner panel that faces to the outer panel.

20. A body side panel comprising:

a metal panel; and plastics that are integrally-molded on the metal panel, wherein the plastics have a first rib that radially disperses an input load and a second rib to which the input load received by the first rib is transferred to restrict the first rib from deforming, and the second rib has a curved shape so as to intersect with the first rib at a right angle.

* * * * *